Roberts & Demorest.

Vulcanizing App's.

No. 1,444. Reissued Mar. 31, 1863.

Witnesses:

Henry C. Tompkins

G. W. H. Halsey

Inventor:

E. A. L. Roberts,
and as assignee of
William J. Demorest
by his atty
L. L. Law

UNITED STATES PATENT OFFICE.

EDWARD A. L. ROBERTS, OF NEW YORK, N. Y., ASSIGNEE OF HIMSELF AND WILLIAM J. DEMOREST.

IMPROVEMENT IN APPARATUS FOR VULCANIZING RUBBER, &c.

Specification forming part of Letters Patent No. 23,948, dated May 10, 1859; Reissue No. 1,441, dated March 31, 1863.

*To all whom it may concern:*

Be it known that EDWARD A. L. ROBERTS and WILLIAM J. DEMOREST, of the city and State of New York, are the inventors of a new and Improved Apparatus for Vulcanizing India-Rubber and other Vulcanizable Gums, of which the following is a full, clear, and exact description, reference being had to the accompanying drawings, making a part of this specification.

Figure 1:
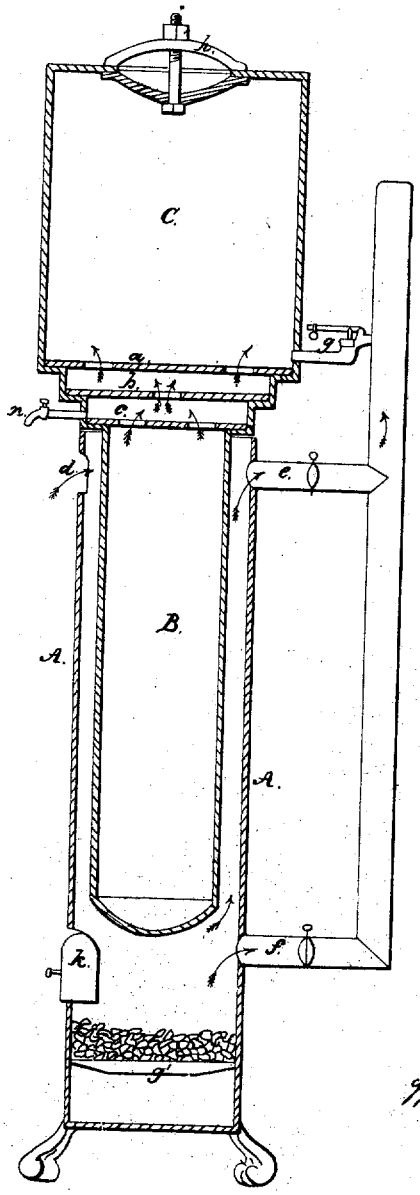
Figure 2:
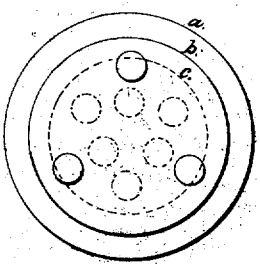

Figure 1 is a vertical section of one form of such apparatus, and Fig. 2 is a plan of the arrangement of the diaphragms hereinafter referred to.

The general nature of the improvement is the production of a compact and portable apparatus for vulcanizing various articles of india-rubber, gutta-percha, &c., and more particularly where small articles are to be vulcanized.

A is a cylindrical stove, having its grate *g'* and door for supplying coal, K, near the bottom. The upper part of the stove is open to receive the lower part, B, of the chamber B C, which part B contains the water for generating the steam, and which extends down some distance from the chamber C, for the double purpose of giving sufficient room for the water and also sufficient heating-surface to the same. The stove A has two flues, *e* and *f*, leading therefrom, and an additional door, *d*, to regulate the heating and cooling, as hereinafter more fully explained.

C is the vulcanizing-chamber, and forms a part of the steam-generating chamber B, being all cast or formed in one, and making, in fact, a continuous single chamber. By this method of construction, forming the steam-generating and vulcanizing chamber all in one and from the same continuous piece of metal, without joint or connection between them requiring the use of bolts, screws, or their equivalents, and packing to connect the parts together, all the expense and difficulty of making such a connection between the parts and keeping such a joint steam-tight is avoided and saved, and all danger of any escape of steam by means of any such joint is removed, and the vulcanization is rendered more certain and perfect.

As vulcanization is necessarily performed at a considerably high temperature and under a good deal of pressure, it is difficult where joints exist to keep them steam-tight.

By making the parts B and C all in one the whole expense of construction is also very much reduced.

Between that part of the chamber B C which is above designated as the "steam-generating" part and that called the "vulcanizing-chamber" are three annular plates or diaphragms, *a b c*, which are thin metallic plates placed a little distance from each other and resting on projections or supports adapted to receive them. These plates are each perforated with three holes, and are so placed that the openings in one are covered by the plate above it, Fig. 2, so that the steam will readily pass up through such openings, but the water or spray will not pass up, but will be deflected back by them. The upper part of the chamber C is furnished with a man hole plate, *h*, or cover for the purpose of giving access to it in charging and removing articles therefrom.

The pressure of steam is determined by a valve, *g*, or its equivalent, placed in any part of the chamber C, and the height of the water may be learned by a cock, *n*, which should be placed a little below the point at which rests the lower diaphragm, *c*.

In the vulcanizing process a temperature uniform, or nearly so, of about 300° is essential. To secure this some means of regulating the heat is necessary.

In the use of a stove such as is above described and is shown in Fig. 1, when the door *d* and damper *f* are closed, and the flue *e* is open, the full force of the draft is directed up around the lower part of the chamber B C and into the flue *e*, thus from the surface exposed heating the part B as rapidly as may be desired. When, however, by the thermometer, which should always be attached to the chamber, it is found that the heat is too great, and it is desired to reduce it, the door *d* and the damper *f* are opened, and the flue or damper *e* is shut. This causes a rush of cold air downward upon the surface of the part B and into the flue *f*, which rapidly cools it. Cooling auxiliaries are made use of when sudden cooling is necessary by the use of water on the outer surface of the chamber, applied with a sponge or in any convenient way.

The chamber B C may be made of a uniform diameter, if for any reason desirable or more convenient, and its parts may be reduced in size without interfering with its operation, and it may be heated in connection with a stove of different construction from that above described, or by any suitable heating process. The construction of the steam-generating and vulcanizing chamber B C, forming them all in one from the same piece of metal, without joint or requiring connecting together (except at the man-hole or cover,) is, however, an essential feature of the apparatus, for the reasons mentioned.

The whole apparatus can be made very compact and portable, and the chamber B C can be readily removed for cleaning or for any other purpose.

What is claimed as new, and is desired to be protected by Letters Patent, is—

1. The general arrangement of the stove A and steam-generating and vulcanizing chamber B C, substantially as set forth.

2. Constructing the steam-generating and vulcanizing chamber or chambers in one or in a continuous chamber, substantially as described.

3. The combination and arrangement of the diaphragms *a b c* in connection with the steam-generating and vulcanizing chamber, substantially as and for the purposes set forth.

E. A. L. ROBERTS.

Witnesses:
S. D. LAW,
G. W. H. HALSEY.